United States Patent [19]

Hanson et al.

[11] Patent Number: 5,197,670
[45] Date of Patent: Mar. 30, 1993

[54] METHOD OF OPERATING A TRANSPORT REFRIGERATION UNIT

[75] Inventors: Jay L. Hanson, Bloomington; Romuald M. Jurewicz, St. Louis Park, both of Minn.

[73] Assignee: Thermo King Corporation, Minneapolis, Minn.

[21] Appl. No.: 782,187

[22] Filed: Oct. 24, 1991

[51] Int. Cl.⁵ .............................................. F25B 29/00
[52] U.S. Cl. .................................. 236/78 D; 165/26; 364/557
[58] Field of Search ...................... 236/78 D; 364/557; 165/26

[56] References Cited

U.S. PATENT DOCUMENTS

| | | | |
|---|---|---|---|
| 4,419,866 | 12/1983 | Howland | 165/26 |
| 4,663,725 | 5/1987 | Truckenbrod et al. | 165/26 |
| 4,694,890 | 9/1987 | Zarate | 165/26 |
| 4,878,465 | 11/1989 | Hanson et al. | 123/179 BG |
| 4,918,932 | 4/1990 | Gustafson et al. | 236/78 D |
| 4,934,593 | 6/1990 | Meyer | 236/78 D |
| 4,977,751 | 12/1990 | Hanson | 62/81 |

Primary Examiner—A. Michael Chambers
Attorney, Agent, or Firm—D. R. Lackey

[57] ABSTRACT

A method of operating a transport refrigeration system having a refrigerant compressor driven by a prime mover. Electrical control maintains the temperature of a load in a conditioned space close to a desired set point via heating, cooling and null cycles, with the prime mover being started and stopped, as required, in response to the difference between the temperature of the conditioned space and a selected set point temperature, i.e., temperature error. Restarting of the prime mover is dynamically controlled by controlling the magnitude of the restart temperature error in response to the difference between the temperature of the conditioned space and ambient temperature.

9 Claims, 8 Drawing Sheets

METHOD OF OPERATING A TRANSPORT REFRIGERATION UNIT

TECHNICAL FIELD

The invention relates in general to transport refrigeration units, and more specifically to transport refrigeration units which have a compressor prime mover, such as an internal combustion engine, operable in a cycling or on-off mode.

BACKGROUND ART

U.S. Pat. No. 4,419,866, which is assigned to the same assignee as the present application, discloses a transport refrigeration system in which a Diesel engine which drives a refrigerant compressor may be selectively operated in either a continuous or a start-stop mode. In the start-stop mode, the Diesel engine is under the control of a refrigeration thermostat, being stopped and restarted as the temperature of a controlled space enters and leaves predefined temperature bands relative to a selected temperature set point.

U.S. Pat. No. 4,878,465, which is also assigned to the same assignee as the present application, discloses improved electrical control for automatically starting a Diesel engine, which simplified the control and improved the logic of the '866 patent. A thermistor in the engine coolant controls the engine pre-heat time. A battery monitor control module determines if the battery charge condition is at a level sufficient to permit the engine to stop. An electronic temperature control module or thermostat controls the temperature of the served space, similar to the '465 patent.

Application Ser. No. 07/728,665, filed Jul. 11, 1991, entitled "A Method Of Operating A Transport Refrigeration Unit", which is assigned to the same assignee as the present application, discloses a method of operating a transport refrigeration unit in which functions of separate control modules of the aforesaid U.S. Patents are integrated and consolidated into one controlling function, such as provided by a computer, and more specifically a microprocessor, while further enhancing and improving the control of a transport refrigeration unit.

SUMMARY OF THE INVENTION

Briefly, the present invention is a method of operating a transport refrigeration unit to control the temperature of a load in a conditioned space to a selected set point temperature via heating, cooling and null cycles. The transport refrigeration unit includes a refrigerant circuit having a compressor, a condenser, and an evaporator. A prime mover for driving the compressor is automatically started and stopped by electrical control in response to predetermined conditions. The method includes the steps of sensing the temperature of the conditioned space, hereinafter called the "load temperature", providing an error temperature responsive to the difference between the load temperature and the selected set point temperature, stopping the prime mover at a predetermined error temperature, sensing the ambient temperature, and providing a dynamic prime mover restart error temperature in response to the magnitude of the difference between the load temperature and the ambient temperature.

When the load temperature is close to ambient, the dynamic selection of the restart error temperature results in delaying restarting of the prime mover, and in certain instances restarting in response to temperature error is prevented. Thus, fuel or energy is conserved, and unnecessary starts are prevented, when the temperature of the served space is close to ambient.

When the load temperature is not close to the ambient temperature, the dynamic selection of the restart error temperature results in the null cycle time being reduced, anticipating an earlier need for a cool or heat cycle. Thus, chances of overshoot of the load temperature on one or both sides of the selected set point temperature are significantly reduced.

BRIEF DESCRIPTION OF THE DRAWINGS

The invention will become more apparent by reading the following detailed description in conjunction with the drawings, which are shown by way of example only, wherein.

DESCRIPTION OF PREFERRED EMBODIMENTS

Figure 1:
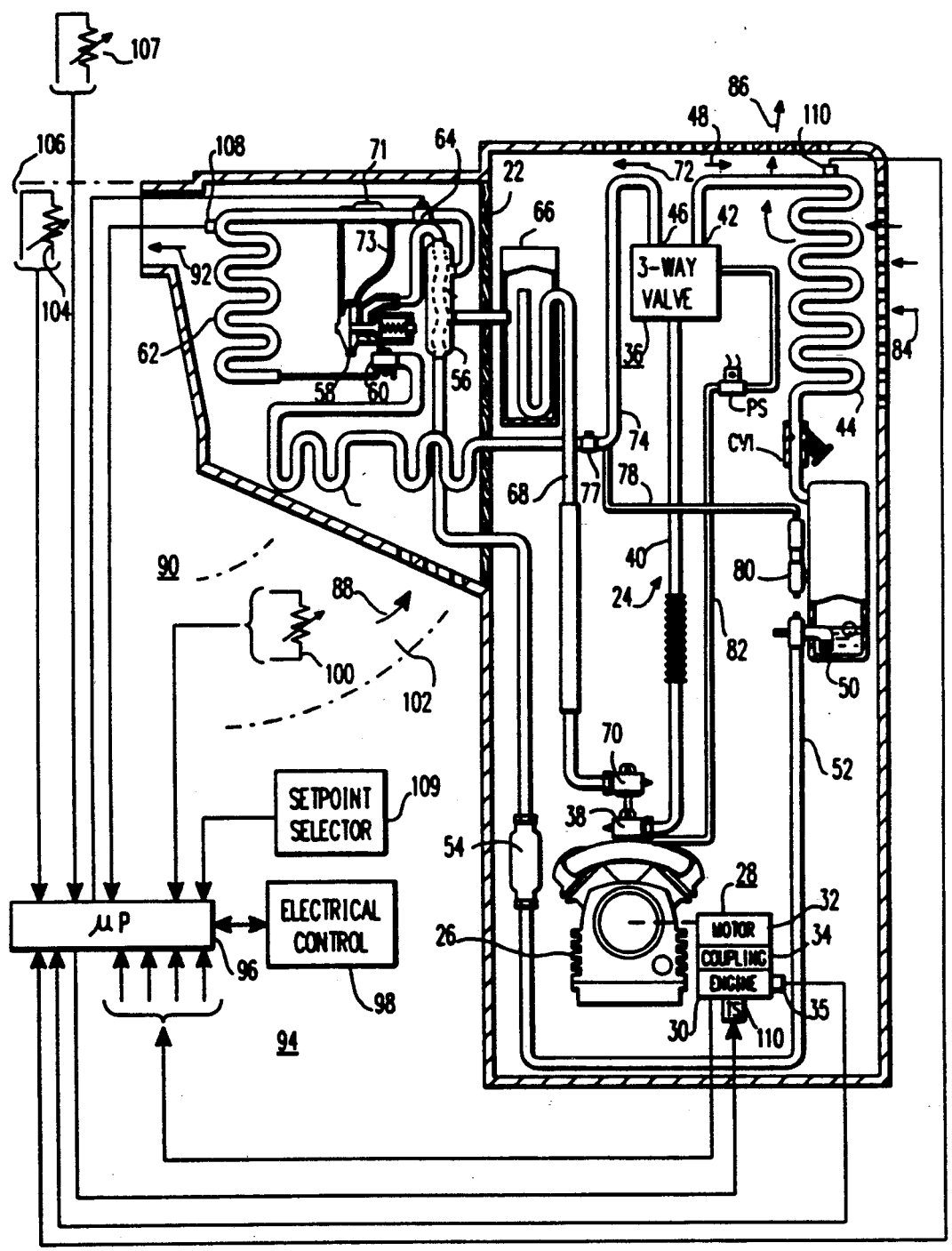
FIG. 1 is a partially block and partially schematic diagram of a refrigeration system which may be controlled by the methods of the invention.

Referring now to the drawings, and to FIG. 1 in particular, there is shown a transport refrigeration unit 20 which may be controlled according to the methods of the invention. Refrigeration unit 20 may be mounted on a container, truck, or trailer, such as on a wall 22 thereof, for example. Refrigeration unit 20 has a closed fluid refrigerant circuit 24 which includes a refrigerant compressor 26 driven by a prime mover arrangement 28. Prime mover arrangement 28 includes an internal combustion engine 30, and it may optionally include a stand-by electric motor 32. Engine 30 and motor 32 are coupled to compressor 26 by a suitable clutch or coupling 34 which disengages engine 30 while motor 32 is operative. A selector 35 selects the desired prime mover.

Discharge ports of compressor 26 are connected to an inlet port of a three-way valve 36 via, a discharge service valve 38 and a hot gas line 40. The functions of three-way valve 36, which selects heating and cooling cycles, may be provided by two separate valves, if desired. Three-way valve 36 has a first output port 42, which is selected to initiate a cooling cycle, with the first output port 42 being connected to the inlet side of a condenser coil 44. Three-way valve 36 has a second outlet port 46, which is selected to initiate a heating cycle, as will be hereinafter described.

When three-way valve 36 selects the cooling cycle output port 42, it connects compressor 26 in a first refrigerant circuit 48, which in addition to condenser 44, includes a one-way condenser check valve CV1, a receiver 50, a liquid line 52, a refrigerant drier 54, a heat exchanger 56, an expansion valve 58, a refrigerant distributor 60, an evaporator coil 62, an optional controllable suction line modulation valve 64, another path through heat exchanger 56, an accumulator 66, a suction line 68, and back to a suction port of compressor 26 via a suction line service valve 70. Expansion valve 58 is controlled by a thermal bulb 71 and an equalizer line 73. The operative prime mover may be protected against overload by controlling modulation valve 64 to provide the function of a conventional compressor throttling valve as taught by U.S. Pat. No. 4,977,751, which is assigned to the same assignee as the present application; or, a conventional compressor throttling valve may be disposed in suction line 68, as desired.

When three-way valve 36 selects the heating cycle output port 46, it connects compressor 26 in a second refrigerant circuit 72. The second refrigerant circuit 72 by-passes condenser 44 and expansion valve 58, connecting the hot gas output of compressor 26 to the refrigerant distributor 60 via a hot gas line 74 and a defrost pan heater 76. A hot gas by-pass solenoid valve 77 may be disposed in hot gas line 74. A by-pass or pressurizing line 78 connects hot gas line 74 to receiver 50 via by-pass and check valves 80, to force refrigerant from receiver 50 into an active refrigerant circuit during heating and defrost cycles.

A conduit or line 82 connects three-way valve 36 to the low side of compressor 26 via a normally closed pilot solenoid valve PS. When solenoid valve PS is deenergized and thus closed, three-way valve 18 is spring biased to select the cooling cycle output port 42. When evaporator 62 requires defrosting, and when the load being conditioned requires heat to maintain set point, pilot solenoid valve PS is energized to allow the low pressure side of compressor 26 to operate three-way valve 36 to select the heating cycle output port 46.

A condenser fan or blower (not shown) causes ambient air 84 to flow through condenser coil 44, with the resulting heated air 86 being discharged to the atmosphere. An evaporator fan or blower (not shown) draws air 88, called "return air", from a served space 90 whose air is to be conditioned, through the evaporator coil 62, and the resulting cooled or heated air 92, called "discharge air" is returned to the space 90. During an evaporator defrost cycle, the evaporator fan or blower is operated, and a defrost air damper (not shown) is operated to close a discharge air path to the conditioned space 90.

Transport refrigeration unit 20 is controlled by microprocessor based electrical control 94 which includes a microprocessor 96 and electrical control 98. The microprocessor 96 receives input signals from appropriate sensors, such as from a return air temperature sensor 100 disposed in a suitable return air path 102, a discharge air temperature sensor 104 disposed in a suitable discharge air path 106, an ambient temperature sensor 107, a coil temperature sensor 108 disposed to sense the temperature of the evaporator coil 62, a set point temperature selector 109 which is manually set to select the desired temperature of a load disposed in the conditioned space 90, a refrigerant pressure sensor or high pressure cut-out HPCO disposed on the high side of the refrigerant circuit 48, and from various engine sensors, such as an oil level sensor, an oil pressure sensor, an engine coolant temperature sensor, and an engine speed sensor.

Microprocessor 96, among other things, controls modulation valve 64, hot gas solenoid valve 77, and a throttle or high speed solenoid 110. Other functions controlled by microprocessor 96, and a complete schematic diagram of electrical control 98 are disclosed in the hereinbefore mentioned patent application Ser. No. 07/728,665, which application is hereby incorporated into the specification of the present application by reference.

Figure 2:
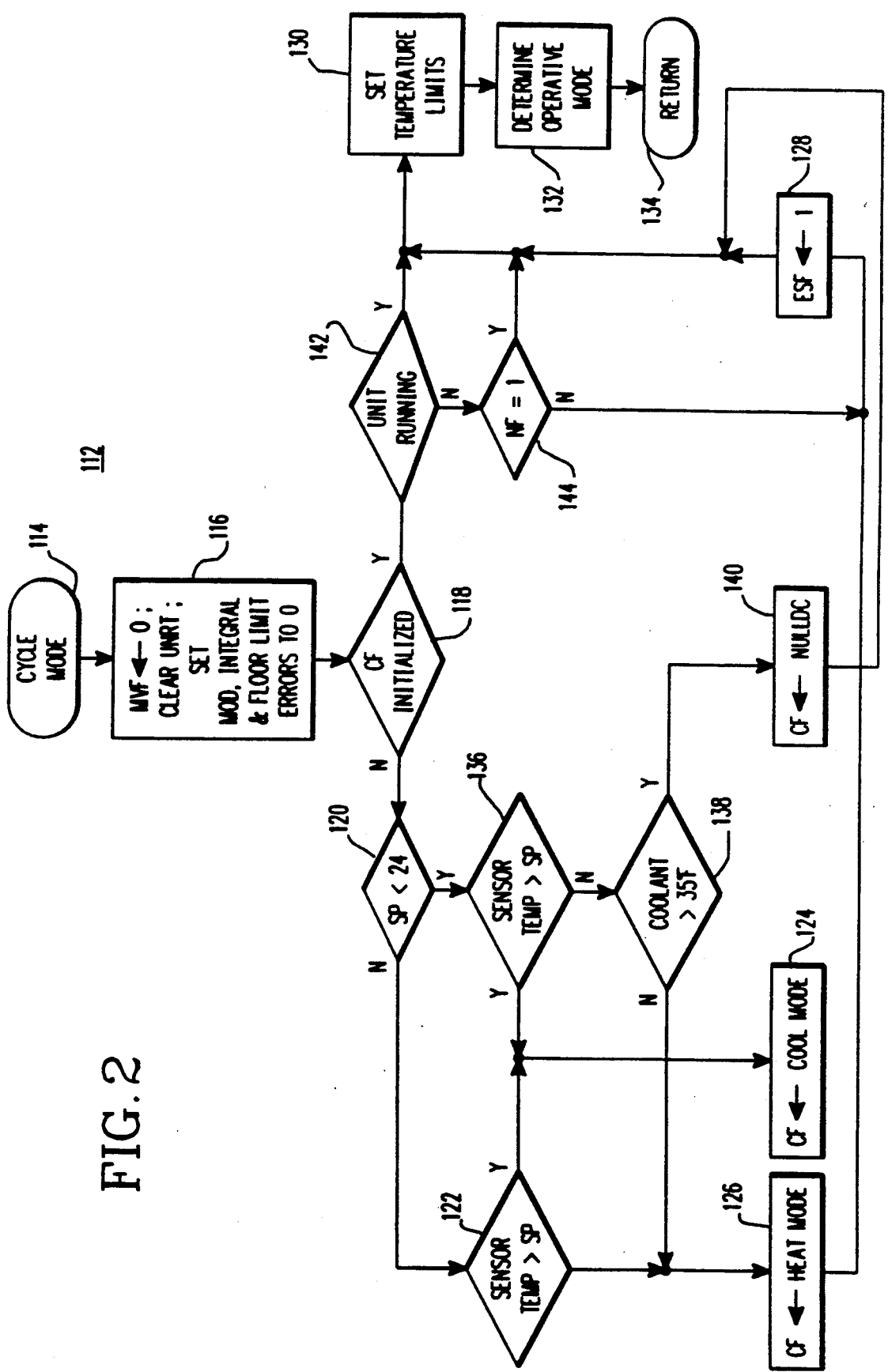
FIG. 2 is a flow chart of a "start-stop" mode of operating the transport refrigeration system shown in FIG. 1.

A flow chart for a cycle mode program 112, which operates transport refrigeration unit 20 in a cycling or start-stop mode, is set forth in FIG. 2. Program 112 is entered at 114 and step 116 sets a modulation flag MVF false, and modulation related values such as integral error and floor limit error are set to 0, since suction line modulation is not used during the cycle mode. Step 116 also clears a unit not running timer UNRT in microprocessor memory. Step 118 then checks to see if a condition flag CF has been initialized. If it has not, unit 20 has just been turned on and step 118 goes to step 120 to determine if the load in load space 90 is fresh or frozen. If the load is fresh the set point temperature selected on selector 109 will be above a predetermined temperature, such as 24 degrees F., for example, and if the load is a fresh load step 120 goes to step 122 to determine the temperature of space 90 relative to the selected set point temperature. If the operative load temperature sensor, such as the return air temperature sensor 100, detects that the load temperature is greater than set point, step 124 sets the condition flag CF to indicate that the unit should operate in a cool mode. If step 122 finds the load temperature is less than set point, then step 126 sets the condition flag CF to indicate the unit should run in a heat mode. Steps 124 and 126 both go to step 128 which sets an engine start flag ESF true, indicating engine 30 should be started by an engine start program. Step 130 sets temperature limits for the relevant control algorithm, with certain of the limits being predetermined and with certain limits being dynamically determined, as will be hereinafter explained. Step 132 checks the condition flag CF to determine the proper operative mode of the selected control algorithm, and the program exits at 134.

If step 120 finds the load space 90 contains a frozen load, step 120 goes to step 136 which checks the load temperature relative to the selected set point temperature. If the load temperature is above set point, step 136 goes to the hereinbefore described step 124 to set condition flag CF to call for a cool mode operative condition. If the load temperature is below the selected set point temperature, it is not necessary to initiate a heating cycle as a frozen load will not be deleteriously affected, and a NULL cycle may be initiated. Before initiating a NULL cycle, however, step 138 determines if the engine coolant temperature is warm enough to allow engine 30 to remain off. For example, step 138 checks an engine block or engine coolant sensor (not shown) to determine if the engine coolant temperature is above a first predetermined temperature, such as 35 degrees F. If it is not, then step 138 goes to the hereinbefore described step 126 which sets condition flag CF to call for a heat mode, and step 128 sets the engine start flag ESF true to call for an engine start.

If step 138 finds the engine coolant temperature is above first the predetermined temperature then engine 30 may remain off and step 138 goes to step 140 which sets condition flag CF to call for a null condition. Step 140 then goes to the hereinbefore described step 130, bypassing step 128, as engine start flag ESF should not be set true, thus allowing the NULL cycle to continue.

If step 118 finds the condition flag CF initialized, step 142 checks to see if unit 20 is running, i.e., whether prime mover 3.0 or prime mover 32 is driving compressor 26. If unit 20 is not running, step 144 checks to see if it should be running by checking the condition of a null flag NF. If flag NF is true, engine 34 should not be running and step 144 goes to step 130 to set the temperature limits, step 132 selects the desired operative condition from the current setting of condition flag CF, and the program exits at 134. If flag NF is not true, the engine should be running and step 144 goes to step 128 to set engine start flag ESF true, and then the program goes through steps 130 and 132, exiting at 134.

Figure 3A:
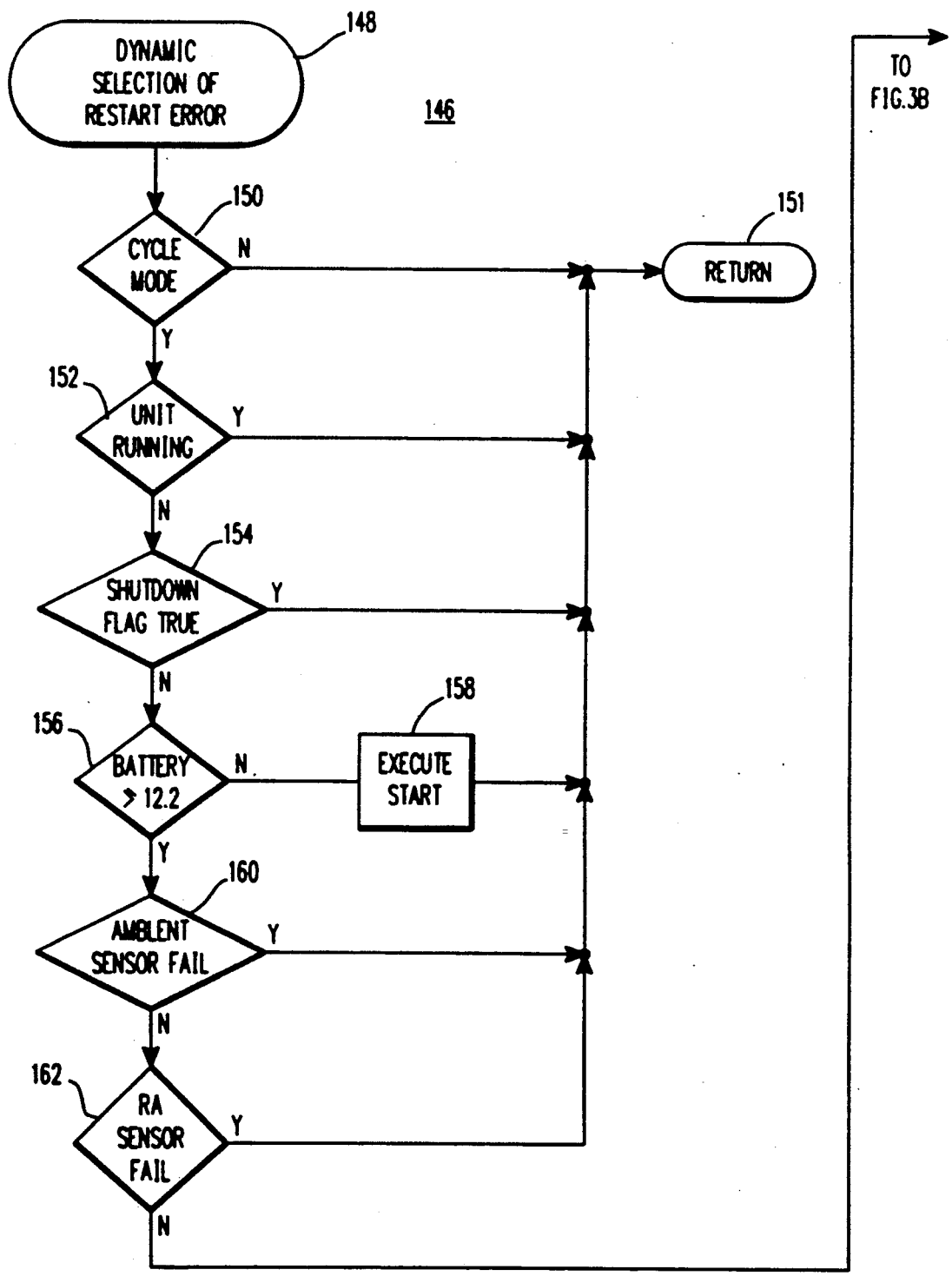
FIGS. 3A and 3B may be assembled to provide a flow diagram which implements the methods of the invention.
Figure 3B:
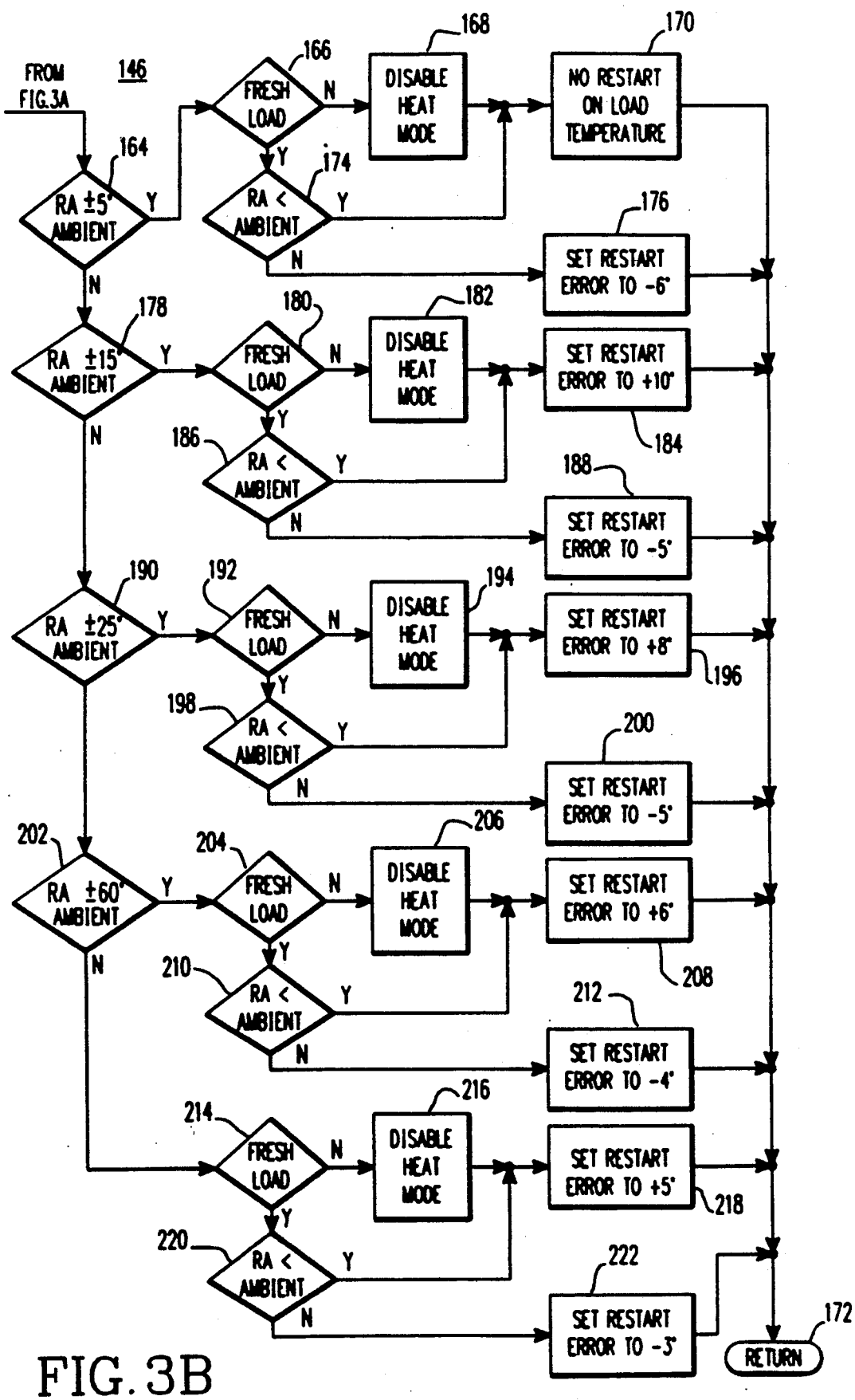

FIGS. 3A and 3B may be assembled to provide a flow chart setting forth a program 146 for establishing certain dynamic restart error limits for starting prime mover 30 or 32 when the prime mover is stopped during a NULL cycle. For purposes of example, it will be assumed that the operative prime mover is engine 30, as motor 32 is a stand-by prime mover which is only operated when the associated truck or trailer is stationary and near a suitable source of electrical potential. The method of the invention includes the steps of: (1) sensing the temperature of the conditioned space 90, hereinafter called the "load temperature", such as by reading the signal provided by the return air sensor 100, (2) providing an error temperature responsive to the difference between the load temperature and the temperature selected on the set point selector 109, with the error temperature being positive when the load temperature exceeds set point, and negative when the load temperature is less than set point, (3) stopping engine 30 at a predetermined error temperature, (4) sensing the ambient temperature by reading the signal provided by ambient temperature sensor 107, and (5) providing a dynamic engine restart error temperature for use by other programs in response to the magnitude of the difference between the load temperature and the ambient temperature. Program 146 set forth in FIGS. 3A and 3B implements step (5), i.e., the method step of providing a dynamic engine restart error temperature, which determines when a NULL cycle is terminated by the starting of engine 30 due to deviation of the load temperature from the selected set point temperature.

More specifically, restart error program 146 is entered at 148 and step 150 determines if the cycle mode of operation has been selected via an appropriate selector switch in electrical control 98. If unit 20 is not being operated in a cycle mode, there is no NULL cycle, and thus no need to set limits for a NULL cycle, and program 146 exits at 151.

When step 150 finds the cycle mode selected, step 152 determines if unit 20 is running, i.e., step 152 determines if compressor 26 being driven by engine 30. If unit 20 is running, refrigeration system 20 is not in a NULL cycle, and thus there is no need to set dynamic limits for a NULL cycle, as it is important that the dynamic limits be set for the most current conditions, i.e., the conditions as they exist during an actual NULL cycle, and the program exits at 151.

If step 152 finds unit 20 not running, step 154 determines if unit 20 is shut down, or is in the process of being shut down, such as by examining a shut down flag which is set true by microprocessor 96 when unit 20 is to be shut down. If step 154 finds unit 20 shut down, or in the process of being shut down, the program exits at 151.

When step 154 finds that unit 20 is not shut down, and not in the process of being shut down, step 156 reads the voltage level of an engine start battery included in electrical control 98. If the battery voltage level does not match or exceed a predetermined value, such a 12.2 volts for a battery nominally rated 12 volts, then the battery needs charging. Since it is important to charge the battery before its output voltage drops below a value which insures reliable restarting, step 156 immediately proceeds to step 158 which executes a start of engine 30, such as by setting the engine start flag ESF true, which was hereinbefore mentioned relative to step 128 in FIG. 2.

Since the invention involves the use of ambient temperature, step 156 proceeds to step 160 when the battery voltage exceeds the predetermined level, with step 160 determining if ambient sensor 107 is providing a plausible value. If step 160 finds that the ambient sensor 107 is faulty, the program exits at 151.

Since the invention also involves the use of load temperature, which is best indicated by return air sensor 100, step 160 proceeds to step 162 when the ambient temperature sensor 107 is found to be functional, with step 162 determining if the return air sensor 100 is providing a plausible value. If step 162 finds that return air sensor 100 is faulty, the program exits at 151.

If program 146 reaches the "no" branch of step 162, it indicates that unit 20 is not shut down, that it is being operated in a cycle mode, that unit 20 is currently in a NULL mode, that the engine start battery has an acceptable output level, and that the ambient temperature sensor 107 and return air sensor 100 are both functional. Step 162 proceeds from the "no" branch to step 164 in FIG. 3B, with step 164 initiating a portion of program 146 which determines the magnitude of the deviation of the load temperature from the ambient temperature.

More specifically, step 164 determines if the load temperature, i.e., the temperature of the return air 88 as detected by return air sensor 100, is very close to the ambient temperature, as detected by ambient temperature sensor 107, such as within ±5 degree F. of the ambient temperature.

If the load temperature is within this predetermined small range of ambient temperature, the load temperature will change very slowly during a NULL cycle and step 164 proceeds to step 166 which determines if the load in the served space 90 is a fresh or frozen load, such as by checking the selected set point temperature to see if it is above 24 degrees F., as hereinbefore mentioned relative to step 120 of FIG. 2. If step 166 finds a frozen load, step 168 disables the heat mode, and step 170 blocks out a restart of engine 30 due solely to load temperature error. Since step 164 found that the load temperature is within ±5 degrees of ambient, the load temperature will not change by more than 5 degrees and thus blocking out a restart due to load temperature error will not adversely affect a frozen load. Unit 20 may be restarted due to conditions other than load temperature error, such as low engine block or water temperature and low battery output voltage. Step 170 may block out a restart due to load temperature error by setting the restart error to a very high value, for example. Step 170 then exits program 146 at 172.

When step 166 finds a fresh load, step 174 determines if the load temperature, as indicated by return air 88, is less than the ambient temperature. If it is, it indicates that the return air can only rise in temperature, and thus a fresh load will not be in danger of freezing during an extended NULL cycle. Thus, step 174 proceeds to step 170, which prevents a restart due to load temperature error, as hereinbefore described.

If step 174 finds that the load temperature is not less than ambient, then colder outside air could eventually damage a fresh load, ruling out an indefinite NULL cycle, and step 174 proceeds to step 176 which provides a restart error value. Since the load temperature is within 5 degrees of ambient, there will be no quick movement of load temperature and step 176 may thus set the temperature error to a predetermined relatively high value, such as −6 degrees F., which will insure a relatively long NULL cycle, without endangering the fresh load, initiating a heat cycle when the falling load temperature reaches a point 6 degrees F. below the selected set point temperature setting.

When step 164 finds that the load temperature is not within the first predetermined relative small range of ambient temperature, e.g., ±5 degrees F., step 178 determines if the load temperature is in a somewhat expanded range relative to ambient temperature, such as within ±15 degrees F. of ambient temperature. If the load temperature is within this expanded range, i.e., the load temperature is within a range of either ±5 degrees to ±15 degrees F., or a range of −5 degrees to −15 degrees F., then step 180 determines if the load is a fresh or frozen load, similar to step 166. If the load being conditioned is a frozen load, step 182 disables the heat mode, and step 184 sets the restart temperature error to a relatively high positive value, e.g., +10 degrees F., for example, insuring a relatively long NULL cycle. When the temperature of the frozen load rises to a value of 10 degrees above the selected set point temperature, then engine 30 will restart with unit 20 in a cool mode, to start to drop the load temperature towards set point.

If the load in conditioned space 90 is found to be a fresh load by step 180, step 186 determines if the temperature of the return air 88 is less than the ambient temperature. If it is, then the temperature of the load will slowly rise during a NULL cycle, and step 186 proceeds to step 184, which provides the positive temperature error limit of +10 degrees. When the temperature error reaches +10 degrees, engine 30 will be started with unit 20 in a cool mode.

When step 180 finds a fresh load and step 186 finds that the return air is not less than ambient, then the load temperature will fall during a NULL cycle, and step 186 proceeds to step 188 which sets the restart error temperature limit, which may be a value slightly smaller than set in step 176, such as −5 degrees, since the load temperature will drop more rapidly as the difference between the load temperature and ambient increases.

When step 178 finds that the load temperature is not within ±15 degrees of ambient, step 190 determines if the load temperature is within an expanded range, such as within ±25 degrees of ambient. If the load temperature is in a range of +15 to +25, or in a range of −15 to −25, of ambient, then step 192 determines if the load is a fresh or a frozen load, with step 194 disabling the heat mode, and step 196 setting the restart error to +8 degrees F., when step 192 finds a frozen load. When step 192 finds a fresh load, step 198 determines if the return air 88 is less than ambient, with step 198 going to the hereinbefore described step 196 to set an error limit of +8 degrees F. when the temperature of the return air is less than the ambient temperature. When step 198 finds that the return air is not less than ambient, step 198 proceeds to step 200 which sets the restart error to −5 degrees F., which is still the same as that set in step 188 as falling load temperature will not change s fast as a rising load temperature due to differential between load temperature and ambient temperature. In other words, the positive error needs re-adjustment for the temperature range provided by step 190, while the negative error does not.

When step 190 finds that the load temperature is not within ±25 degrees of ambient, step 202 determines if the load temperature is within an expanded range, such as within ±60 degrees of ambient. If the load temperature is in a range of +25 to +60, or in a range of −25 to −60, of ambient, then step 204 determines if the load is a fresh or a frozen load, with step 206 disabling the heat mode, and step 196 setting the restart error to +6 degrees F., when step 204 finds a frozen load. When step 204 finds a fresh load, step 210 determines if the return air 88 is less than ambient, with step 210 going to the hereinbefore described step 208 to set an error limit of +6 degrees F. when the temperature of the return air is less than the ambient temperature. When step 210 finds that the return air temperature is not less than ambient temperature, step 210 proceeds to step 212 which sets the restart error to −4 degrees F., reducing it from the previous temperature error limit of −5 degrees F.

When step 202 finds that the load temperature is not within ±60 degrees of ambient temperature, it is in the last temperature deviation range provided by the present example, i.e., beyond ±60 degrees F. of ambient. Step 202 proceeds to step 214 which determines if the load is a fresh or a frozen load. When the load is frozen, step 216 disables the heat mode, and step 218 sets the restart error to +5 degrees F. When step 214 finds a fresh load, step 220 determines if the return air 88 is less than ambient, with step 220 going to the hereinbefore described step 218 to set an error limit of +5 degrees F. when the temperature of the return air is less than the ambient temperature. When step 220 finds that the return air is not less than ambient, step 220 proceeds to step 22 which sets the restart error to −3 degrees F., reducing it from the previous temperature error limit of −4 degrees F.

Figure 4:
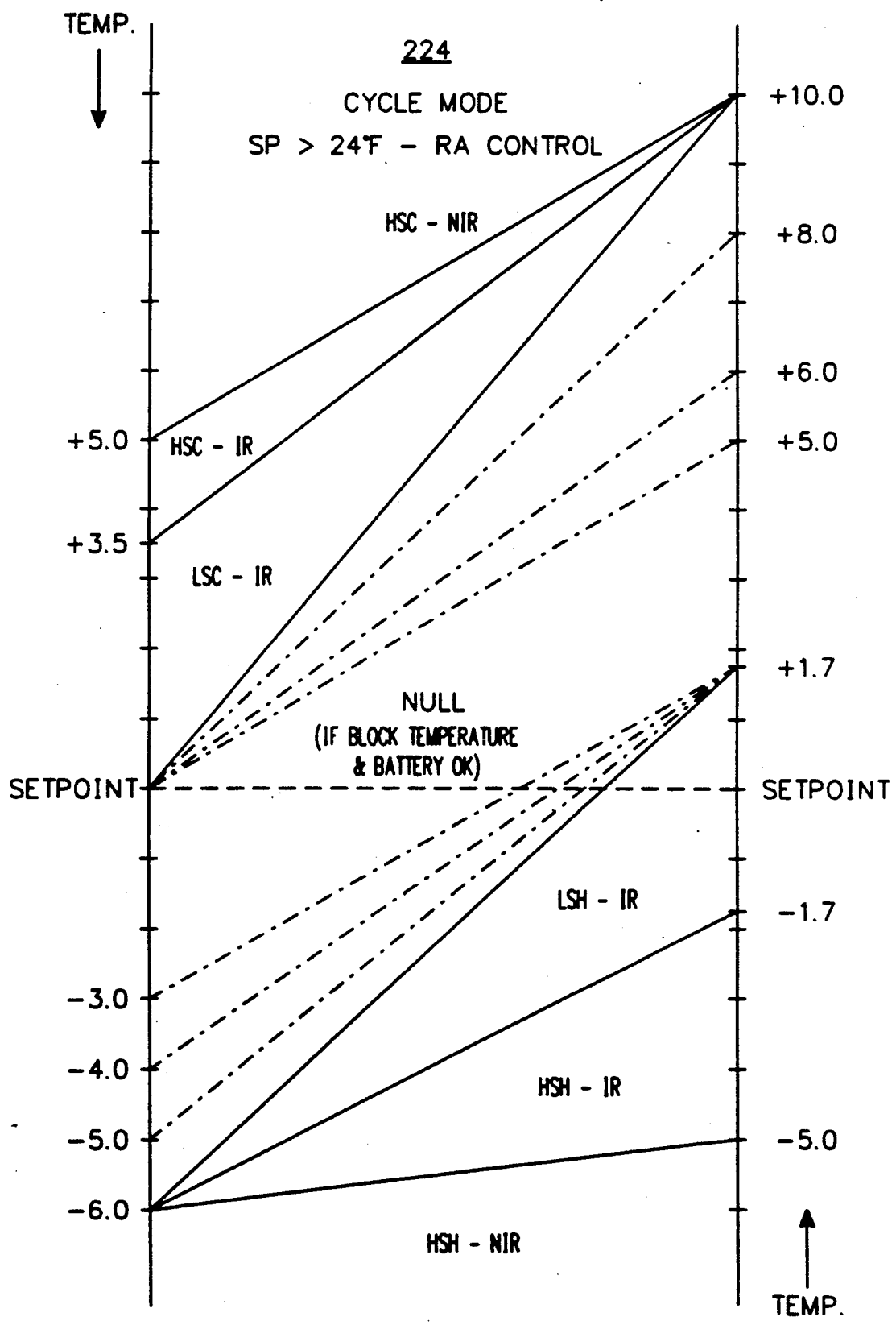
FIG. 4 is a chart setting forth a return-air control algorithm utilized by the cycling mode shown in FIG. 2, when the set point is greater than 24 degrees F.

FIG. 4 is a chart of an exemplary control algorithm 224 for the cycle mode, which is used when the selected set point temperature is above 24 degrees F., indicating a fresh load, and the operative sensor is the return air sensor 100, with algorithm 224 incorporating the dynamic or flexible limits of the NULL cycle, as described relative to FIGS. 3A and 3B. When the temperature of the load space 90 is falling, the left-hand side of algorithm 224 is utilized, and when the temperature is rising the right-hand side of algorithm 224 is used. The various operating modes are the different modes which are indicated by the condition flag CF, as selected by step 132 of the cycle mode program 112.

Assuming that the load space is in initial temperature pull down, the operative mode will be high speed cool, not-in-range, until the load temperature, as indicated by return air sensor 100, indicates a temperature error of +5 degrees F. relative to the selected set point temperature. A high speed cool, in-range program will then be run until sensor 100 indicates a temperature error of +3.5 degrees F. has been reached, at which point a low speed cool, in-range program may be run. When the load temperature, as measured by the return air sensor 100, indicates that the selected set point temperature has been reached, engine 30 may be turned off, if the engine coolant temperature is high enough, as described relative to step 138 in FIG. 2, and the ampere draw from the battery is less than a predetermined value, as will be hereinafter described relative to FIG. 6B, to enter a NULL cycle or condition.

As long as the engine block or water temperature does not fall below a predetermined value, and the battery output voltage exceeds the predetermined minimum value, engine 30 will remain off until a temperature error limit for the NULL cycle is reached. When the temperature of the return air 88 is greater than the ambient temperature, then the load temperature will continue to drop during the NULL cycle, terminating the NULL cycle at a temperature error magnitude which is inversely proportional to the deviation of the load temperature from ambient temperature. If the load temperature is within ±5 degrees of ambient temperature, then the temperature error limit will be the largest, i.e., −6 degrees F., and if the load temperature exceeds ±60 degrees of ambient, then the temperature error limit will be the smallest, i.e., −3 degrees F., with temperature error steps of −5 degrees and −4 degrees F. between these two limits.

When the applicable dynamic limit of −3 degrees to −6 degrees F. is reached, engine 30 will be started in a high speed, not-in-range, heat mode if the temperature error exceeds −6, otherwise starting in a low speed, in-range, heat mode. When the error temperature has been reduced to −1.7 degrees F., unit 20, if in high speed, drops to low speed, staying in the heat mode until the temperature error reaches +1.7 degrees F., at which point engine 30 shuts down, and unit 20 is in a NULL mode.

If the temperature of the return air 88 is less than ambient, then the load temperature will start to rise during the NULL mode, and the dynamic positive values of temperature error will apply. With a rising temperature, the right-hand side of control algorithm 224 is applicable. Again, the applicable positive limit is inversely proportional to the difference between the temperature of the return air 88 and the ambient temperature, having an error temperature limit of +10 degrees F. when the temperature difference between the return air and ambient is small, such as within ±5 degrees, and having a error temperature limit of +5 degrees F. when the temperature difference between the return air and ambient is large, such as greater than ±60 degrees F., with temperature error steps of +8 degrees and +6 degrees F. between these two limits. When the applicable positive temperature error limit is reached, engine 30 will be started in low speed cool, in range, if the temperature error is less than +10 degrees F., and the load temperature will start to drop, again following the left hand side of the algorithm 224. If the temperature error is +10 degrees F., then engine 30 will be started in a high speed cool mode.

Figure 5:
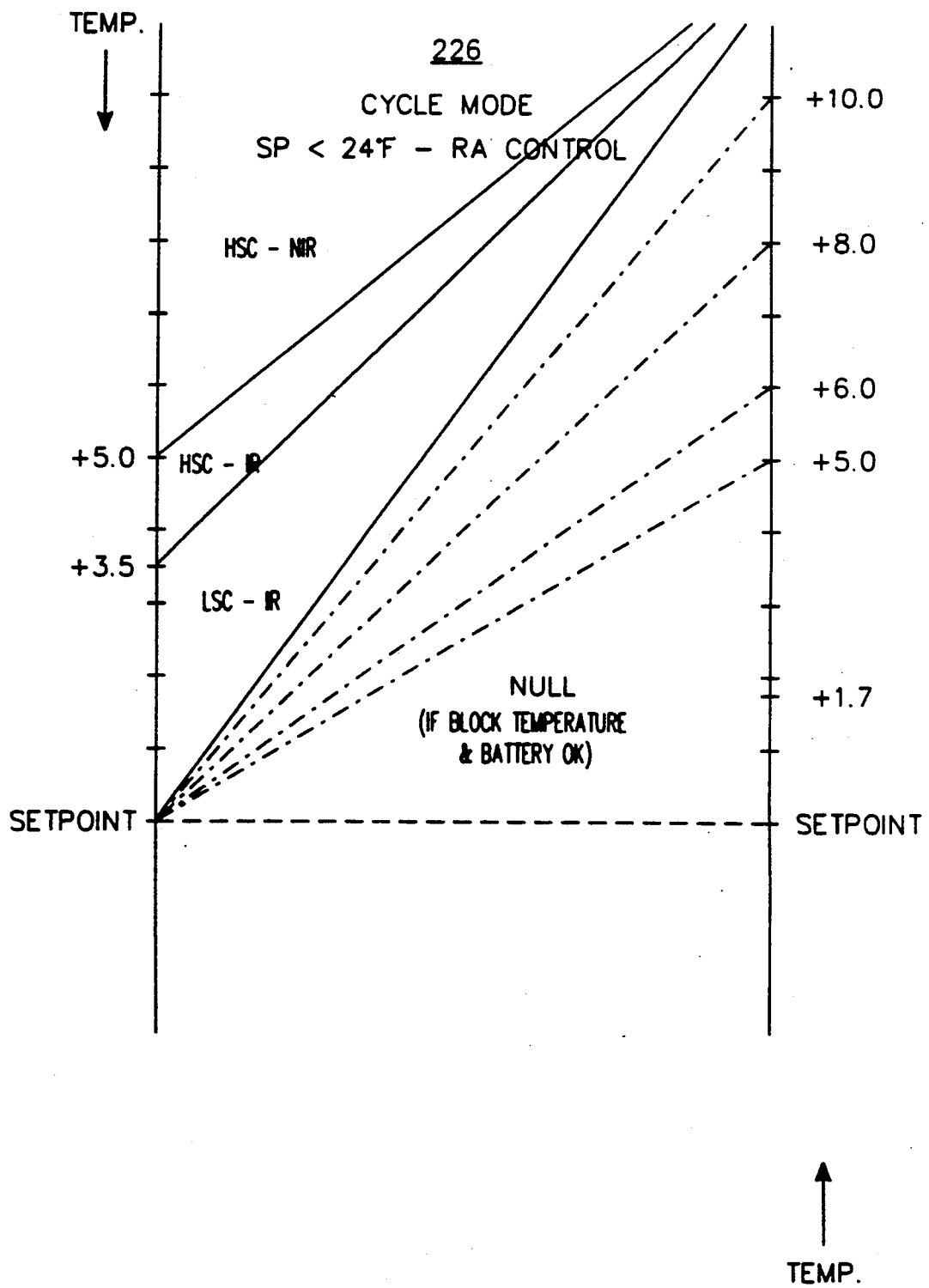
FIG. 5 is a chart setting forth a return-air control algorithm utilized by the cycling mode shown in FIG. 2, when the set point is 24 degrees and below.

FIG. 5 is a chart of a an exemplary control algorithm 224 for the cycle mode, which is used when the selected set point temperature is below 24 degrees F., indicating a frozen load in conditioned space 90, and the operative sensor is the return air sensor 100, with algorithm 226 incorporating the dynamic or flexible limits of the NULL cycle, as described relative to FIGS. 3A and 3B. When the temperature of the load space 90 is falling, the left-hand side of algorithm 226 is utilized, and when the temperature is rising the right-hand side of algorithm 226 is used. The various operating modes are the different modes which are indicated by the condition flag CF, as selected by step 132 of the cycle mode program 112.

Assuming that the load space is in initial temperature pull down, the operative mode will be high speed cool, not-in-range, until the load temperature, as indicated by return air sensor 100, indicates a temperature error of +5 degrees F. relative to the selected set point temperature. A high speed cool, in-range program will then be run until sensor 100 indicates a temperature error of +3.5 degrees F. has been reached, at which point a low speed cool, in-range program is run. When the load temperature, as measured by the return air sensor 100, indicates that the selected set point temperature has been reached, engine 30 may be turned off, if the engine coolant temperature is high enough, as described relative to step 138 in FIG. 2, and the ampere draw from the battery is less than a predetermined value, as will be hereinafter described relative to FIG. 6B, to enter a NULL cycle or condition.

With a frozen load, there is no lower limit to the NULL cycle, as one of the steps 168, 182, 194, 206 or 216 of FIG. 3B disables the heat mode. When the load temperature starts to rise during NULL, which would be due to the ambient temperature being higher than temperature of the return air 88, the temperature error at which engine 30 is started is dynamically related to the difference between the return air temperature and the ambient temperature. When this difference is small, such as when the return air is within ±5 degrees of ambient, there is no upper limit to NULL, indicated by the solid line boundary of the NULL cycle having no intersection with the right hand chart vertical. When the difference between the return air temperature and the ambient temperature increases, the dynamic restart error temperature becomes finite at +10 when the difference between the load temperature and ambient is from +5 to +15 or from −5 to −15, and the dynamic restart error continues to drop as the difference increases, having progressively lower error temperature steps of +8 degrees, +6 degrees, and +5 degrees F.

In the incorporated patent application, the microprocessor 96 "remembers" whether each NULL condition is entered from a cooling mode or from a heating mode by running two different null programs called NULLDC, which is run when NULL is entered from a cooling mode, and NULLDH, which is run when NULL is entered from a heating mode. The dynamic error temperature limits apply to both null programs.

Figure 6A:
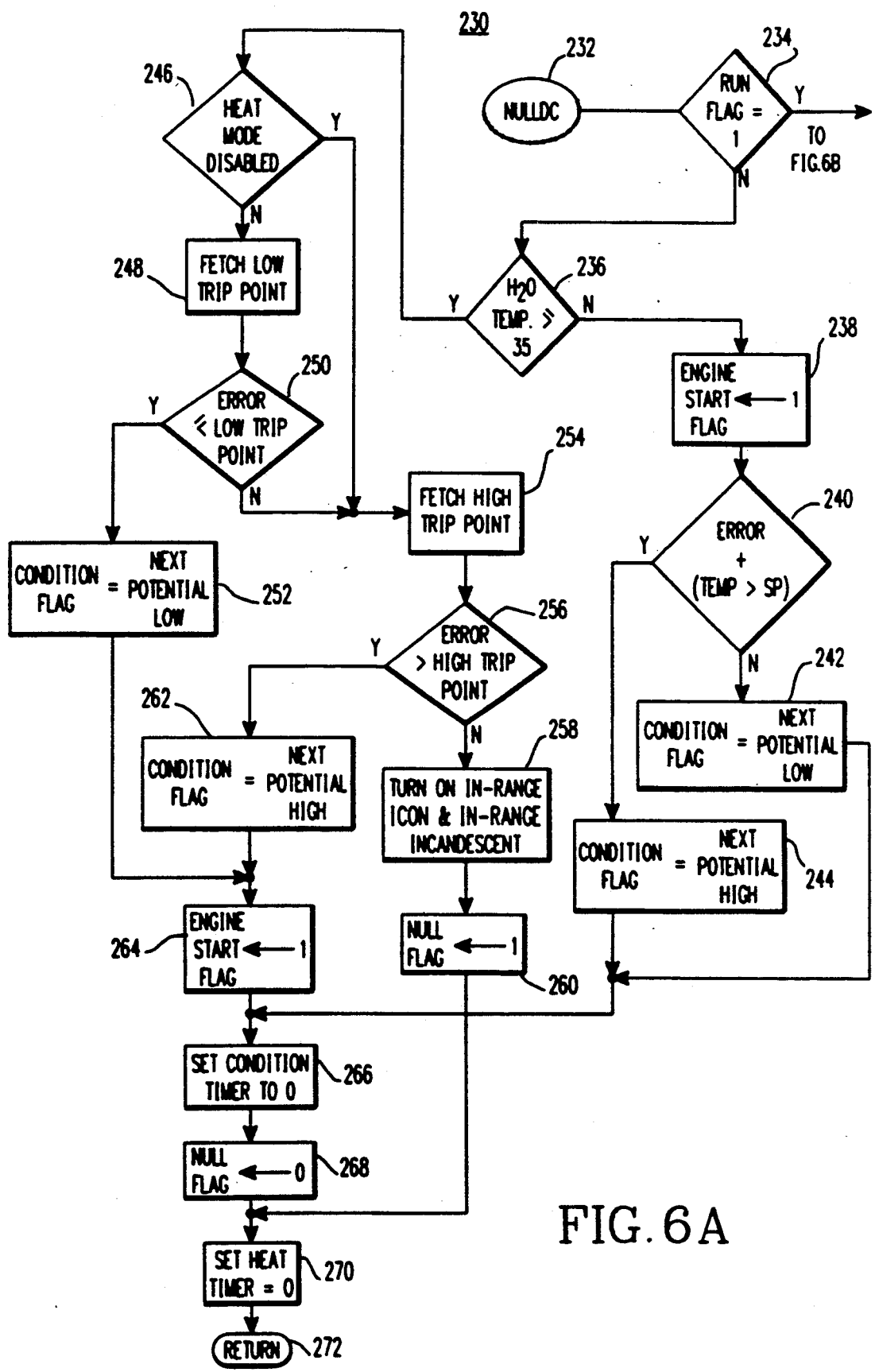
FIGS. 6A and 6B may be assembled to provide a flow chart which implements a null cycle, as set forth in the algorithms of FIGS. 4 and 5.
Figure 6B:
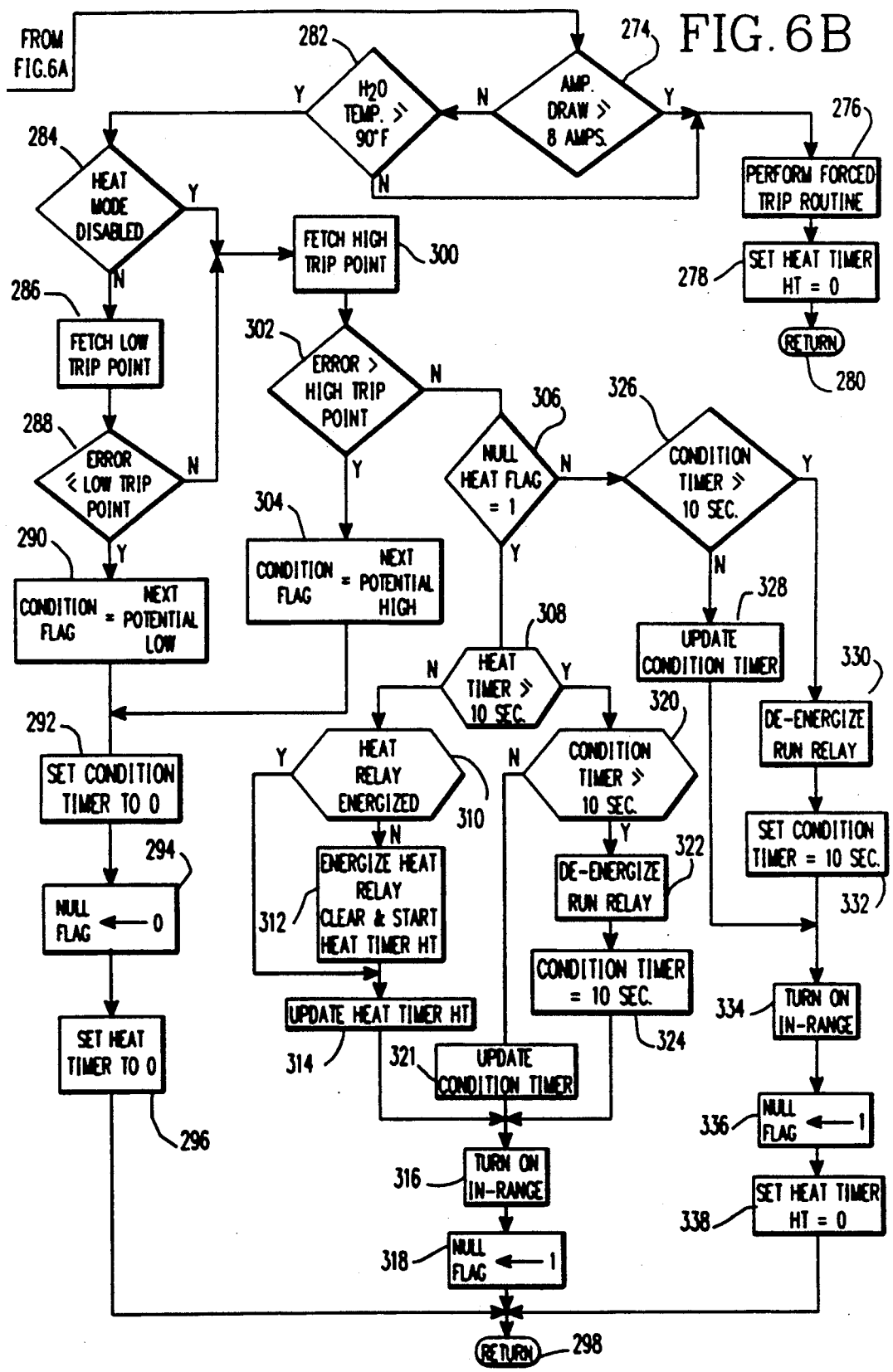

FIGS. 6A and 6B may be combined to provide a program 230 for the hereinbefore mentioned operating condition NULLDC, which program is called when the null cycle is entered from a cooling cycle. NULLDH is similar to NULLDC, as far as the application of the teachings of the invention, and thus it will not be necessary to review NULLDH. Program 230 is entered at 232 and step 234 checks a run flag RF, which is set by microprocessor 96 when unit 20 is running. If unit 20 is not running, step 236 checks the input from an engine coolant sensor to see if engine 30 should be started because its block or water temperature has dropped below a predetermined value, such as 35 degrees F. If the coolant temperature is below the predetermined value, step 238 sets the engine start flag ESF true, to signify that engine 30 should be started.

Step 240 then determines whether engine 30 should be started in a heating cycle or a cooling cycle, by checking the temperature of the conditioned space 90 relative to the set point temperature. This is quickly checked by determining whether the error between the load temperature and the set point temperature is positive or negative. If step 240 finds the error negative, i.e., the load temperature is below or "colder" than set point, and step 242 sets condition flag CF to the "next potential low" operating condition. The term next potential low operating condition means the unit operating condition which is just below the present operating condition on the left-hand side of the pertinent control algorithm. Using the control algorithm of FIG. 4 as an example, since the present operating condition is NULLDC, the next operating condition in the lower direction would be low speed heat, assuming that the error is less than −6 degrees F.

If the temperature error is positive, i.e., the load temperature is above or "warmer" than set point, and step 244 sets condition flag CF to the "next potential high" operating condition. The term "next potential high" means the unit operating condition which is just above the present operating condition on the right-hand side of the pertinent control algorithm. For example, since the present operating condition is NULLDC, the next operating condition in the upper direction on the control algorithm of FIG. 4 would be low speed cool, assuming that the error temperature is less than +10 degrees F.

If step 236 finds the temperature of engine 30 is greater than the predetermined temperature, e.g., 35 degrees F., engine 30 does not have to be started because it is getting cold and step 236 goes to step 246. Step 246 determines if the heat mode has been disabled, such as by one of the heat mode disabling steps 168, 182, 194, 206 or 216 of program 146. If the heat mode has not been disabled, step 246 proceeds to step 248 which fetches the last determined low trip point for NULL, which is an error temperature for the lower limit of NULL. This value may be a value determined by program 146, such as when the load in conditioned space 90 is a fresh load and the temperature of the return air is not less than the ambient temperature. When the temperature of the return air is greater than ambient temperature the low trip point may simply be a default value, such as −3.5 degrees F. Step 250 compares the error between load temperature and set point with the "low trip point". If step 250 finds the error is equal to or below the presently effective low trip point on the control algorithm, the load temperature has dropped out of the range of NULLDC and step 252 sets condition flag CF to the next potential low, which would be low speed heat in the control algorithm of FIG. 4.

If step 250 finds that the error is not below the low trip point, step 250 proceeds to step 254, as does the "yes" branch from step 246. Step 254 fetches the last determined high trip point for NULL, which is an error temperature for the upper limit of NULL. This value may be a value determined by program 146, such as when the load in conditioned space 90 is a frozen load, or a fresh load and the temperature of the return air is less than the ambient temperature. With a fresh load when the temperature of the return air is not less than ambient temperature the high trip point may simply be a default value, such as +5.1 degrees F. Step 256 then determines if the temperature error is greater than, i.e., above the currently effective "high trip point" on the control algorithm. If step 256 finds the error is greater than the high trip point, the load temperature has risen out of the range of NULLDC and step 262 sets the condition flag CF to the next potential high, which would be low speed cool in the control algorithm of FIG. 4, assuming that the error is less than +10 degrees F.

If step 256 finds the error is not greater than the high trip point, the error is thus still within the range of NULLDC and step 256 goes to step 258 which energizes display elements which indicate the load temperature is "in-range", and step 260 sets null flag NF true, to indicate that unit 20 should be in NULL.

Steps 252 and 262 both proceed to step 264 which sets engine start flag ESF true, to indicate engine 30 should be started. Step 264 and steps 242 and 244 all proceed to step 266 which sets a condition timer CT in microprocessor memory to zero. Condition timer CT times how long unit 20 has been in each new operating condition, to insure that unit 20 remains in each operating condition for a predetermined minimum period of time, e.g., 10 seconds, before going to another operating condition. Step 266 goes to step 268 which sets null flag NF to 0, to indicate that unit 20 should no longer be in NULL. Steps 268 and 260 both proceed to step 270 which sets a heat timer HT in microprocessor memory to 0. The purpose of heat timer HT will be hereinafter explained. The program then exits at 272.

If step 234 finds engine 30 running, step 234 goes to step 274 in FIG. 6B which checks to see if the battery charging current exceeds a predetermined value which indicates the battery condition is such that engine 30 should not be stopped, e.g., 8 amperes. If step 274 finds the battery charging current exceeds the predetermined value, step 276 performs a "forced trip" routine, i.e., step 276 keeps engine 30 running. Step 278 sets heat timer HT to 0, and the program exits at 280. The forced trip routine of step 276 sets null flag NF to 0, indicating unit 20 should not stop, and it sets condition flag CF to either the next potential low or the next potential high operating condition, using the value and polarity of the error between the load temperature and set point to make the determination.

If step 274 finds the battery charging current is less than the predetermined value, step 274 goes to step 282 which checks the input provided by an engine coolant sensor to see if engine 30 is warm enough to allow engine 30 to turn off, i.e., above a second predetermined temperature such as 90 degrees F. Steps 236 and 238 initiated the starting of engine 30 when the temperature dropped below the first predetermined temperature, 35 degrees F., for example, and step 282 makes sure the temperature of engine 30 is above the second predetermined temperature when it stops. This difference between the engine starting and stopping temperatures insures that engine 30, once turned off, will not be quickly started again due to step 236. If step 282 finds the engine coolant temperature below the second predetermined value, step 282 goes to step 276 to continue running engine 30.

If step 282 finds the temperature of the engine coolant warmer than the second predetermined temperature, step 284 checks to see if the heat mode has been disabled by program 146. If the heat mode has not been disabled, step 286 fetches the low trip point, which may have been determined by program 146, and step 288 determines if the load temperature versus set point temperature error is below the low trip point. If so, step 290 sets condition flag CF to the next potential low operating condition, step 292 sets condition timer CT to 0, step 294 sets null flag NF to 0, step 296 sets heat timer HT to 0, and the program exits at 298.

If step 288 finds the error is above the low trip point, step 288 proceeds to step 300, as does step 284 when the heat mode has been disabled. Step 300 fetches the high trip point, which may have been determined by program 146, and step 302 determines if the error exceeds the high trip point. If it does, step 304 sets condition flag CF to the next potential high, and the program continues to the hereinbefore described step 292.

If step 302 finds the load temperature versus set point error is not above the high trip point, the load temperature is in the range of NULLDC, and the engine may be stopped. Before stopping the engine, however, step 306 checks a null heat flag NHF to see if it is set. Flag NHF is set to select a program option which, when unit 20 enters null from a cooling cycle, causes unit 20 to switch from cool to heat for a short period of time just long enough to warm the evaporator coil 62. Entering null with a cold evaporator may cause the "cold" from the evaporator to affect the operative temperature sensor and cause premature starting of engine 30.

If the null heat option has been selected, i.e., flag NHF is true, step 306 goes to step 308 which checks the hereinbefore mentioned heat timer HT, to see if it has reached or exceeded a predetermined value, e.g., 10 seconds, selected as the time for the unit to be in a heating cycle, before entering the null mode from a cooling cycle. At this point in the program, heat timer HT will be 0 and the program checks to see if a heat relay in electrical control 98 is energized. At this point in the program the heat relay will not be energized, and step 312 energizes the heat relay and it clears and starts heat timer HT. Step 314 updates heat timer HT, step 316 energizes display elements to indicate "in-range", i.e., that the load temperature is in the "null" range, step 318 sets null flag NF true, indicating the load temperature is in the "null" range, and the program exits at 298. The next time through the program, step 310 will find the heat relay energized and proceed to step 314, to update heat timer HT. When step 308 finds heat timer HT has reached the predetermined value, e.g., 10 seconds, step 308 goes to step 320 which checks condition timer CT to make sure that unit 20 has been in the present operating condition for the predetermined time, e.g., 10 seconds in this example. If the predetermined value of condition timer CT is longer than the predetermined value of heat timer HT, then step 320 may find that condition timer CT has not reached the predetermined value, and step 320 would then proceed to step 321 which updates condition timer CT.

When condition timer CT reaches the predetermined value, step 320 goes to step 322 which de-energizes a run relay in electrical control 98 to stop engine 30 by removing voltage from a fuel solenoid. Step 324 sets condition timer CT equal to the predetermined value, and the program goes through the hereinbefore mentioned steps 316 and 318 to the program exit 298.

If step 306 finds that the null heat option has not been selected, i.e., flag NHF is false, step 306 goes to step 326 to check the value of condition timer CT. If condition timer CT has not reached the predetermined value, step 328 updates condition timer CT. If step 326 finds condition timer CT has reached the predetermined value, step 330 de-energizes the run relay in electrical control 98, and step 332 sets condition timer CT to the predetermined value. Step 332 and step 328 both go to step 334 which turns on "in-range" display elements, step 336 sets null flag NF true, step 338 sets heat timer HT to 0, and the program exits at 298.

The program for NULLDH is similar to the program for NULLDC, except steps 624 through 646 related to the null heat option are omitted, since NULLDH is entered from a heating cycle and the evaporator will already be warm.

In summary there has been disclosed a method of operating a transport refrigeration unit in a cycling mode, including heat, cool and null cycles, with the temperature error which triggers starting of the compressor prime mover from a null cycle being dynamically determined. In the prior art, the temperature errors which trigger restarting of the prime mover are compromises, restarting the prime mover too soon in many instances, and not starting it soon enough in others. By relating the restart temperature error to the difference between the load temperature and the ambient temperature restarting is optimized. When the load temperature is close to ambient, restarting can be delayed, saving fuel. When the load temperature is not close to ambient, restarting can be earlier, anticipating a shift of load temperature out of the NULL range, preventing long recovery periods, as well as maintaining the load temperature closer to the selected set point.

We claim:

1. A method of operating a transport refrigeration unit which includes a refrigerant circuit having a compressor, a condenser, and an evaporator, a prime mover for driving the compressor, and electrical control, with the electrical control automatically starting and stopping the prime mover to control the temperature of a load in a conditioned space to a selected set point temperature via heating, cooling and null cycles, comprising the steps of:
   sensing the temperature of the conditioned space,
   providing an error temperature responsive to the difference between the sensed temperature of the conditioned space and the selected set point temperature,
   stopping the prime mover at a predetermined error temperature,
   sensing the ambient temperature,
   and providing a dynamic prime mover restart error temperature in response to the magnitude of the difference between the temperature of the conditioned space and the ambient temperature.

2. The method of claim 1 including the steps of:
   checking the selected set point temperature to determine if the load in the conditioned space is a frozen load, and
   disabling the heat cycle when the checking step finds that the load in the conditioned space is a frozen load.

3. The method of claim 2 wherein the step of providing a temperature error provides only positive temperature error values when the checking step finds the load in the conditioned space is a frozen load, indicative of the load temperature being above the selected set point temperature.

4. The method of claim 3 wherein the step of preventing restart of the prime mover due to temperature error when the checking step finds the load in the conditioned space is a frozen load, and the difference between the load temperature and the selected set point temperature is less than a predetermined minimum value.

5. The method of claim 1 including the steps:

checking the selected set point temperature to determine if the load in the conditioned space is a fresh load, and preventing restart of the prime mover due to temperature error when the checking step finds the load in the conditioned space is a fresh load, the temperature of the conditioned space is less than the ambient temperature, and the difference between the load temperature and the selected set point temperature is less than a predetermined minimum value.

6. The method of claim 1 including the steps of:

checking the selected set point temperature to determine if the load in the conditioned space is a fresh load, and, when the checking step finds that the load in the conditioned space is a fresh load, the steps of:

determining if the temperature of the served space is greater than the ambient temperature, providing a restart error temperature having a positive value when temperature of the served space is less than the ambient temperature, which is effective when the load temperature is higher than the selected set point temperature, and providing a restart error temperature having a negative value when the temperature of the served space is greater than ambient temperature, which is effective when the load temperature is lower than the selected set point temperature.

7. The method of claim 1 wherein the step of sensing the temperature of the served space senses the temperature of air returning to the refrigeration system.

8. A method of operating a transport refrigeration unit which includes a refrigerant circuit having a compressor, a condenser, and an evaporator, a prime mover for driving the compressor, and electrical control, with the electrical control automatically starting and stopping the prime mover to control the temperature of a load in a conditioned space to a selected set point temperature via heating, cooling and null cycles, comprising the steps of:

sensing the temperature of the conditioned space, providing an error temperature responsive to the difference between the sensed temperature of the conditioned space and the selected set point temperature, stopping the prime mover at a predetermined error temperature, sensing the ambient temperature, and providing a dynamic prime mover restart error temperature in response to the magnitude of the difference between the temperature of the conditioned space and the ambient temperature, said step of providing the dynamic prime mover restart error temperature providing a restart error temperature which results in increasing the null cycle time as the magnitude of the difference between the temperature of the conditioned space and the ambient temperature is decreased, and which results in decreasing the null cycle time as the magnitude of the difference between the temperature of the conditioned space and the ambient temperature is increased.

9. A method of operating a transport refrigeration unit which includes a refrigerant circuit having a compressor, a condenser, and an evaporator, a prime mover for driving the compressor, and electrical control, with the electrical control automatically starting and stopping the prime mover to control the temperature of a load in a conditioned space to a selected set point temperature via heating, cooling and null cycles, comprising the steps of:

sensing the temperature of the conditioned space, providing an error temperature responsive to the difference between the sensed temperature of the conditioned space and the selected set point temperature, stopping the prime mover at a predetermined error temperature, sensing the ambient temperature, and providing a dynamic prime mover restart error temperature in response to the magnitude of the difference between the temperature of the conditioned space and the ambient temperature, said step of providing the dynamic prime mover restart error temperature providing a restart error temperature which decreases in magnitude as the difference between the temperature of the conditioned space and the ambient temperature increases, and which increases in magnitude as the difference between the temperature of the conditioned space and the ambient temperature decreases.

* * * * *